(12) United States Patent
Verbrugge et al.

(10) Patent No.: US 10,759,633 B2
(45) Date of Patent: Sep. 1, 2020

(54) ROTATING EYE BOLT ASSEMBLY WITH LOCK MECHANISM

(71) Applicant: THE CROSBY GROUP LLC, Tulsa, OK (US)

(72) Inventors: Peter Verbrugge, Tulsa, OK (US); Chris Van Den Heuvel, Houtvenne (BE); Roger Beall, Mounds, OK (US); Floyd Hendrix, Tulsa, OK (US)

(73) Assignee: The Crosby Group LLC, Tulsa, OK (US)

( * ) Notice: Subject to any disclaimer, the term of this patent is extended or adjusted under 35 U.S.C. 154(b) by 374 days.

(21) Appl. No.: 15/552,397

(22) PCT Filed: Mar. 5, 2015

(86) PCT No.: PCT/US2015/018904
§ 371 (c)(1),
(2) Date: Aug. 21, 2017

(87) PCT Pub. No.: WO2016/140673
PCT Pub. Date: Sep. 9, 2016

(65) Prior Publication Data
US 2018/0029846 A1 Feb. 1, 2018

(51) Int. Cl.
*F16B 39/00* (2006.01)
*B66C 1/66* (2006.01)
(Continued)

(52) U.S. Cl.
CPC ............... *B66C 1/66* (2013.01); *F16B 35/06* (2013.01); *F16B 39/10* (2013.01); *F16B 39/101* (2013.01);
(Continued)

(58) Field of Classification Search
CPC ...... Y10T 403/32213; Y10T 403/32975; B66C 1/66; F16G 15/08; F16B 39/10;
(Continued)

(56) References Cited

U.S. PATENT DOCUMENTS 4,500,240 A * 2/1985 Moran ................. F16B 41/002
411/103
4,592,686 A * 6/1986 Andrews ................. B66C 1/66
248/499

(Continued)

FOREIGN PATENT DOCUMENTS

CN 103221699 7/2013
DE 4403785 8/1995
(Continued)

OTHER PUBLICATIONS

Mike Parnell, Rigging Tips: Swivel Hoist Ring vs. Shoulder Eyebolt Industrial Training International ITI; Nov. 22, 2010; pp. 1-3; http://www.iti.com/pro-rigger-mike-parnell/bid/37245/Rigging-Tips-Swivel-Hoist-Ring-vs-Shoulder-Eyebolt USA.
(Continued)

*Primary Examiner* — Matthew R McMahon
(74) *Attorney, Agent, or Firm* — Head, Johnson, Kachigian & Wilkinson, PC (57) ABSTRACT

A rotating eye bolt assembly with lock mechanism. The assembly includes a threaded bolt having a multi-sided head. A lifting bail includes a pair of opposed legs, a track and a central opening through the track. A bushing having an upstanding cylindrical lip is received in the lifting bail central opening. A lock plate is slidable on the track with the lock plate having an upstanding shoulder engageable with the bolt head. The lock plate is movable between a locked position for installation and removal of the assembly and an unlocked position for use of the assembly.

7 Claims, 7 Drawing Sheets

(51) Int. Cl.
*F16B 35/06* (2006.01)
*F16B 45/00* (2006.01)
*F16B 39/10* (2006.01)
F16B 43/02 (2006.01)
F16B 41/00 (2006.01)
F16B 21/18 (2006.01)

(52) U.S. Cl.
CPC ............ *F16B 45/00* (2013.01); *F16B 21/186* (2013.01); *F16B 41/002* (2013.01); *F16B 43/02* (2013.01); *Y10T 403/32213* (2015.01); *Y10T 403/32975* (2015.01)

(58) Field of Classification Search
CPC ........ F16B 39/101; F16B 45/00; F16B 35/06; F16B 43/02; F16B 41/002
See application file for complete search history.

(56) References Cited

U.S. PATENT DOCUMENTS

| | | | | |
|---|---|---|---|---|
| 5,350,201 A * | 9/1994 | Bynum | ................. | F16L 19/005 285/92 |
| 5,405,210 A | 4/1995 | Tsui | | |
| 5,603,594 A * | 2/1997 | Lincoln | ................. | F16B 41/002 411/104 |
| 5,690,457 A | 11/1997 | Smetz | | |
| 6,039,500 A * | 3/2000 | Kwon | ....................... | B66C 1/66 294/215 |
| 6,068,310 A * | 5/2000 | Fuller | ....................... | B66C 1/66 294/215 |
| 6,322,306 B1 * | 11/2001 | Dutton | .................... | F16B 2/245 411/120 |
| 7,611,317 B2 * | 11/2009 | Muderlak | ............ | A47K 5/1217 222/333 |
| 8,353,649 B2 * | 1/2013 | Csik | ...................... | F16B 37/045 411/108 |
| 8,740,275 B2 * | 6/2014 | Smetz | ....................... | B66C 1/66 294/215 |
| 9,188,151 B2 * | 11/2015 | Ivanic | .................... | B60P 7/0807 |
| 9,664,224 B2 * | 5/2017 | Ivanic | .................... | B60P 7/0807 |
| 2004/0026586 A1 * | 2/2004 | Vu | ........................ | F16B 5/0208 248/309.1 |
| 2010/0266333 A1 | 10/2010 | Oswald et al. | | |
| 2013/0251444 A1 | 9/2013 | Ivanic et al. | | |
| 2014/0327262 A1 * | 11/2014 | Alba | ........................ | B66C 1/66 294/215 |

FOREIGN PATENT DOCUMENTS

| | | |
|---|---|---|
| DE | 202012103079 | 10/2012 |
| EP | 0654611 A1 | 5/1995 |
| EP | 0654611 B1 | 1/1998 |
| JP | H07217630 | 8/1995 |
| WO | 200151401 | 7/2001 |
| WO | 2012072095 | 6/2012 |

OTHER PUBLICATIONS

Pewag, PLGW-SN Eye Nut Leaflet for pewag winner profilift PLGW-SN Eye nut—grade 10; Nov. 2013; p. 1-2; www.pewag.com; Informationsblatt PLGW-SN_E_11-2013.indd 1.

* cited by examiner

ROTATING EYE BOLT ASSEMBLY WITH LOCK MECHANISM

BACKGROUND OF THE INVENTION

1. Field of the Invention

The present invention relates to a rotating eye bolt assembly with an integrated lock mechanism for use in lifting tackle. In particular, the present invention is directed to a rotating eye bolt assembly having a bolt connected to a load to be lifted and a ring or eye bolt for connection to a connecting element such as a sling for lifting wherein the rotating eyebolt assembly may be moved between a locked position for installation and removal and an unlocked position for use.

2. Prior Art

Various types of equipment are utilized for rigging in order to lift a heavy load. Factors to be considered in selection and use of lifting equipment include the weight of the load itself, possible vibration or rocking of the load, the attachment of the threaded bolt to the load, and the angle of attachment. In one arrangement, a threaded bolt is attached and received in the load to be lifted. A ring, eye, or bail extending therefrom is thereafter used to connect to a connector such as a hook or shackle which, in turn, is connected to a wire line, a sling or other equipment for lifting. Examples include threaded eyebolts, shoulder eyebolts, and swivel hoist rings.

A single lifting point may be utilized, in which case the single leg is substantially vertical above the center of gravity of the load. Alternatively, multiple lifting points may be utilized such as two, three or four lifting points. In the case of multiple lifting points, certain torque forces result on the lifting point.

Accordingly, it would be desirable to provide a rotating eye bolt assembly which is capable of locking the eye bolt assembly in place while preventing the threaded bolt from loosening from the load during use.

It would also be desirable to provide a rotating eye bolt assembly that permits rotation of the bail during use in response to the load forces while remaining attached to the load.

It would also be desirable to provide a rotating eye bolt assembly with a lock mechanism which permits dismounting of the rotating eye bolt assembly when desired.

It would also be desirable to provide a rotating eye bolt assembly which may be threadably attached to a load and then detached from the load without any special tools.

It would also be desirable to provide a rotating eye bolt assembly which permits locking or unlocking of the bail to the assembly without any tools and eliminates any need for separate clasps, clips, or pins which can become dislodged.

SUMMARY OF THE INVENTION

The present invention is directed to a rotating eye bolt assembly with a lock mechanism. The eyebolt assembly includes a threaded bolt which will be threadably received in an opening in the load. The bolt also includes a multi-sided head.

A lifting bail has a pair of extending opposed legs which terminate in a pair of opposed, substantially parallel, upstanding walls. The lifting bail also includes a flat track between the opposed legs and between the opposed walls. A central cylindrical opening is provided in and through the track for receipt of the shaft of the threaded bolt. A bushing has a substantially central cylindrical lip which is receivable in the central opening of the lifting bail. In an unlocked, use position, the lifting bail is permitted to rotate about the axis of the bolt and the cylindrical lip.

A lock plate having a substantially flat base or bottom surface is slidable on the flat track between the locked position which locks the lifting bail with respect to the bolt and an unlocked position which permits rotation of the lifting bail with respect to the bolt. The lock plate has two opposed ends and an elongated opening or slot therethrough. The bolt passes through the elongated slot so that the head of the bolt rests on the top surface of the lock plate. On one of the opposed ends of the lock plate is an upstanding shoulder having an inner contour that mates with the head of the bolt.

In one embodiment, a pair of opposed retaining springs are retained in the lock plate with each of the springs having a portion projecting into the slot of the lock plate.

When in the locked position, the upstanding shoulder of the lock plate will engage the head of the threaded bolt. Accordingly, rotation of the lifting bail will also rotate the bolt.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

Figure 1:
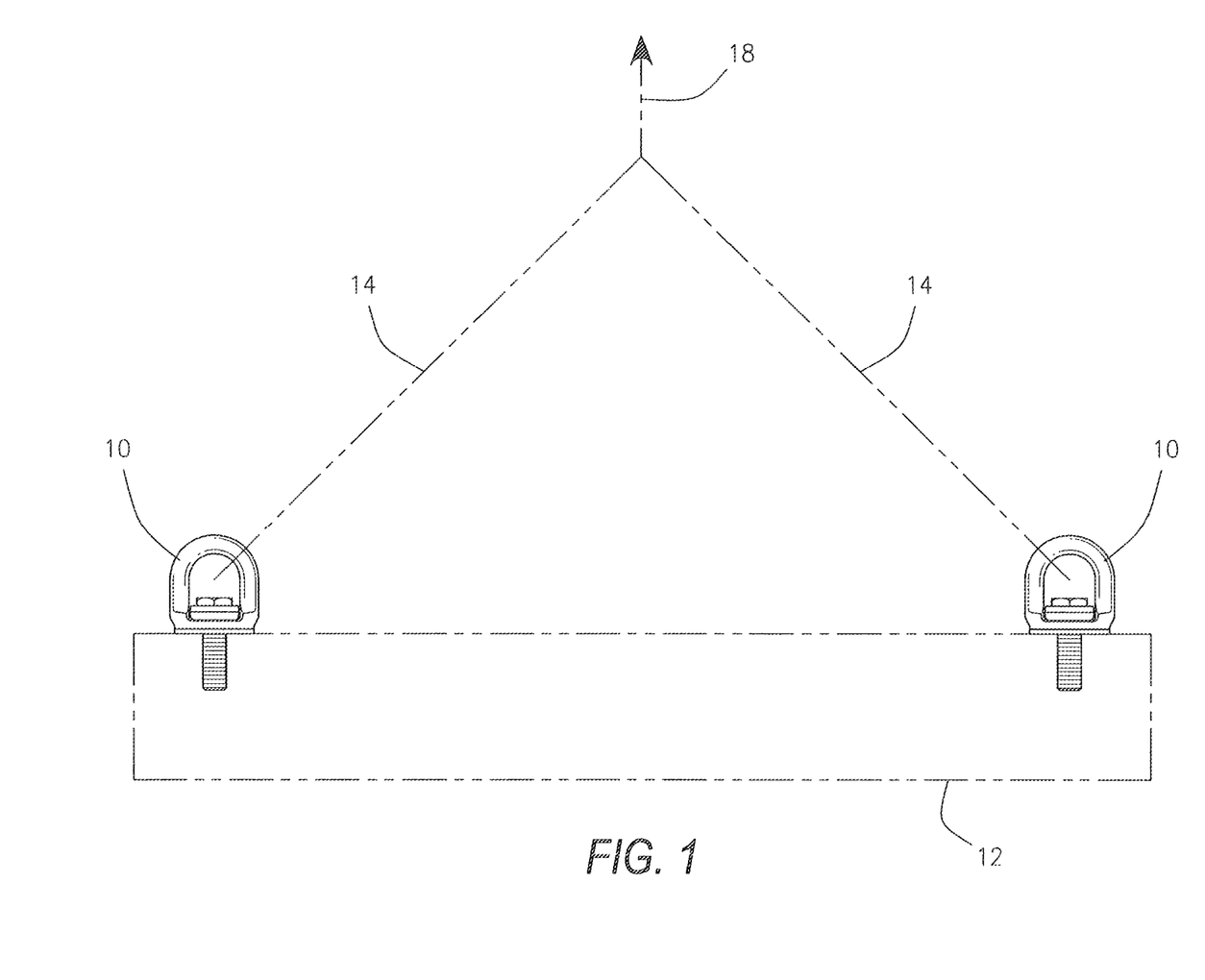
FIG. 1 illustrates a pair of rotating eye bolt assemblies constructed in accordance with the present invention shown secured to a load (in dashed lines) to be lifted.

Referring to the drawings in detail, FIG. 1 illustrates a pair of rotating eye bolt assemblies 10, each of which is threadably secured to a load 12 (shown in dashed lines). Depending on the particular load to be lifted, on the design of the lift, and on the rigging equipment, one or more rotating eye bolt assemblies 10 may be utilized. With a single lift point, the direction of the lift will be substantially vertical to the load 12. In the arrangement shown in FIG. 1, a pair of lifting points is utilized. A greater or lesser number of lifting points might be employed within the spirit and scope of the present invention.

A connecting element, such as a wire rope or synthetic sling (not shown) will be attached to each eye bolt assembly 10. Thereafter, the connecting elements are joined together, such as with a master link, and thereafter attached to lifting equipment. As shown in FIG. 1, the dashed lines 14 indicate the sling attachments to the lifting equipment. The direction of the lifting force is illustrated by a dashed line with arrow 18.

The rotating eye bolt assembly 10 includes a lifting bail (to be described herein). The plane of the lifting bail of the rotating eye bolt assembly 10 should ideally be aligned with the sling lines 14. Accordingly, during use, the lifting bail should ideally be permitted to rotate to the direction of force.

Figure 2:
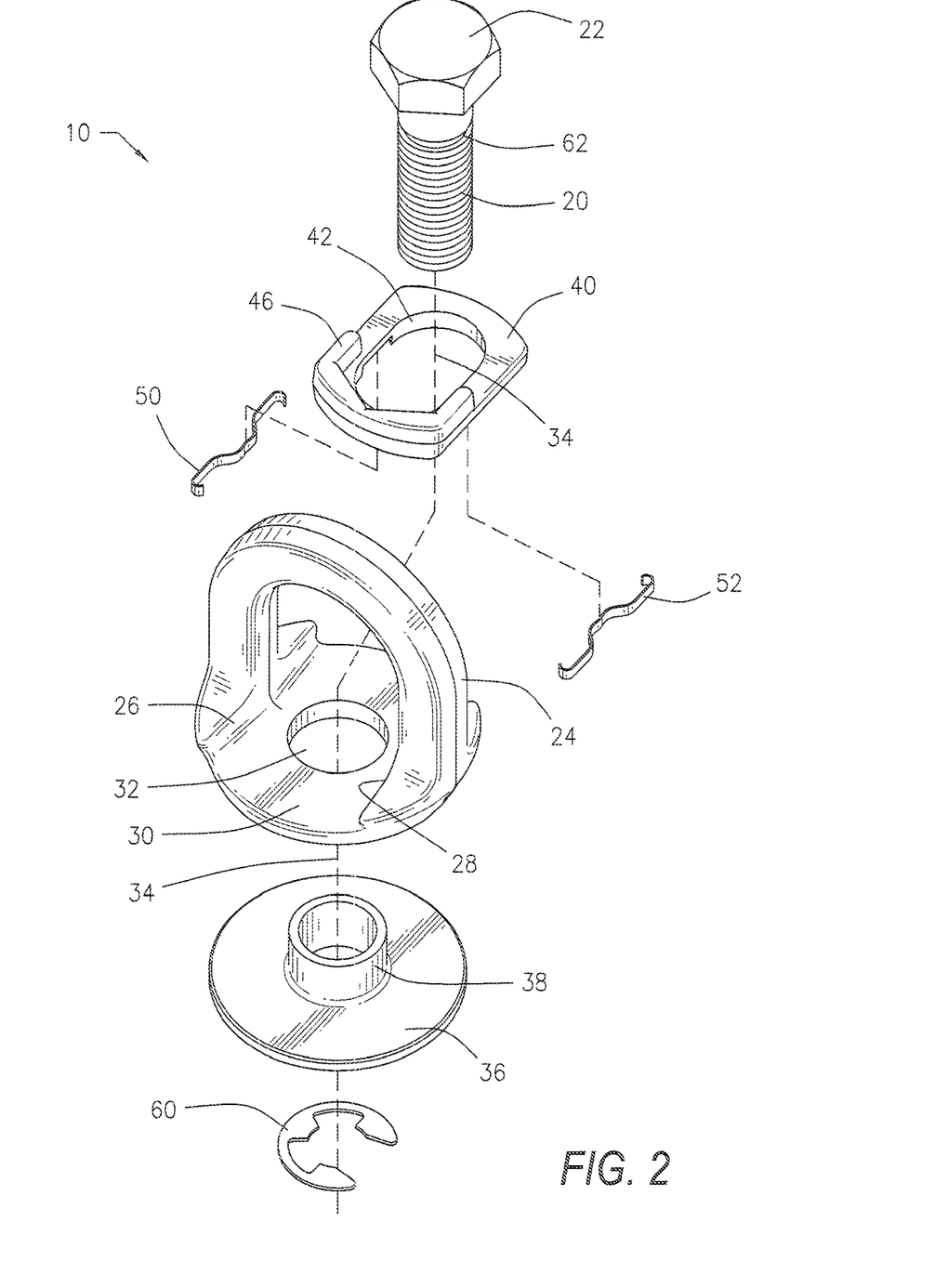
FIG. 2 illustrates an exploded view of the rotating eye bolt assembly shown in FIG. 1 apart from the load.

FIG. 2 illustrates an exploded view of a rotating eye bolt assembly 10 apart from the load 12. A threaded bolt 20 will be threadably received in an opening in the load 12 (not shown in FIG. 2). The bolt 20 also includes a multi-sided head 22. In a preferred embodiment, a hex head bolt is utilized although other types of bolts may be employed within the spirit and scope of the invention.

A lifting bail 24 has a pair of extending opposed legs which terminate in a pair of opposed, substantially parallel, upstanding walls 26 and 28.

The lifting bail 24 also includes a flat track 30 between the opposed legs and between the opposed walls 26 and 28. The flat track 30 is substantially perpendicular to the legs of the lifting bail 24. A central cylindrical opening 32 is provided in and through the track 30 for receipt of the shaft of the threaded bolt 20. When installed, the axis of the bolt 20 is aligned with the axis of the central opening 32 as illustrated by dashed lines 34.

A bushing 36 has a substantially flat base which mates with the load 12 (not shown in FIG. 2). The bushing 36 has an upstanding central cylindrical lip 38 which is receivable in the central opening 32 of the lifting bail 24. The central cylindrical lip 38 is coaxial with the central opening 32 of the lifting bail 24 and with the shaft of the bolt 20. In an unlocked, use position, the lifting bail 24 is permitted to rotate about the axis of the bolt 20 and the cylindrical lip 38.

A lock plate 40 has a substantially flat base or bottom surface which is slidable on the flat track 30 between a locked position which locks the lifting bail 24 with respect to the bolt 20 and bushing 36 and an unlocked position which permits rotation of the lifting bail 24 with respect to the bolt 20 and the bushing 36.

The lock plate 40 has two opposed ends and an elongated opening or slot 42 therethrough. The shaft of the bolt 20 passes through the elongated slot 42 so that the head 22 of the bolt rests on the top surface of the lock plate 40.

On one of the opposed ends of the lock plate 40 is an upstanding shoulder 46. The upstanding shoulder 46 has an inner contour that mates with the head 22 of the bolt 20.

A pair of opposed retaining springs 50 and 52 are retained in the lock plate 40 with each of the retaining springs 50 and 52 having a portion projecting into the slot 42 of the lock plate 40.

A removable clip 60 may be inserted around the threaded bolt 20 and may be received in a groove or recess 62 in the shaft of the bolt 20 when the rotating eye bolt assembly 10 has been fully assembled.

Figure 3:
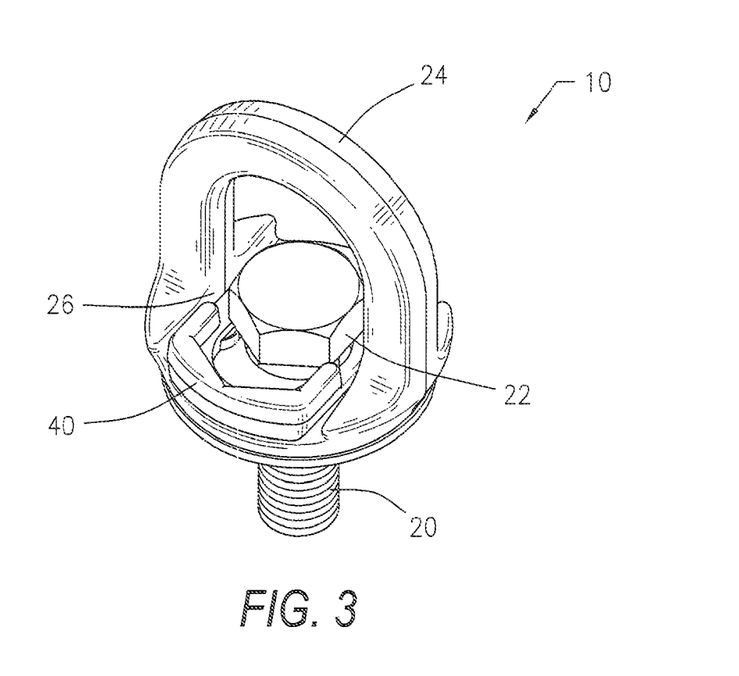
FIG. 3 illustrates a perspective view of the rotating eye bolt assembly shown in FIG. 2 in an unlocked position.
Figure 4:
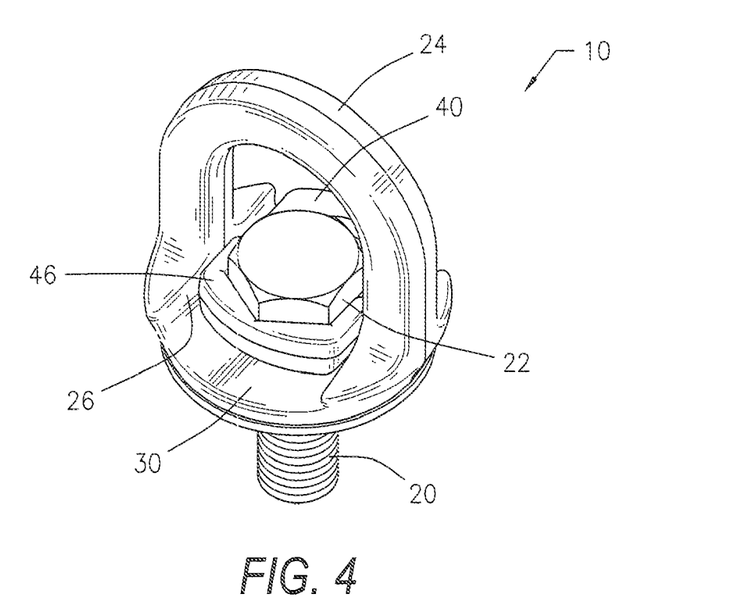
FIG. 4 illustrates the rotating eye bolt assembly shown in FIG. 3 in a locked position.

The rotating eye bolt assembly 10 has two alternating positions—a locked position whereby rotation of the bail rotates the bolt 20 and an unlocked position whereby the bail 24 rotates independent of the bolt 20. FIG. 3 illustrates a perspective view of the rotating eye bolt assembly 10 in an unlocked position for use, while FIG. 4 illustrates a perspective view of the rotating eye bolt assembly 10 in a locked position for installation or disassembly.

When the rotating eye bolt assembly 10 is in the locked position, the upstanding shoulder 46 of the lock plate 40 will engage the head 22 of the threaded bolt 20.

When in the locked position, rotation of the bail 24 causes the upstanding opposed walls 26 and 28 to rotate which engages the lock plate 40 and causes the lock plate to rotate. Accordingly, rotation of the lifting bail 24 will also rotate the bolt 20. When in the locked position, the assembly 10 may therefore be threadably secured to the load 12. When in the locked position, the assembly 10 may also be unthreaded or disassembled in order to detach the assembly from the load 12. It will be appreciated that no special tools and no special clips, pins or clasps are necessary for installation or removal of the eye bolt assembly 10.

Conversely, when the lock plate 40 is in the unlocked position, the lifting bail 24 will be permitted to rotate with respect to the bushing 36 and with respect to the threaded bolt 20. The lock plate 40 will remain in the open position during use.

Figure 5:
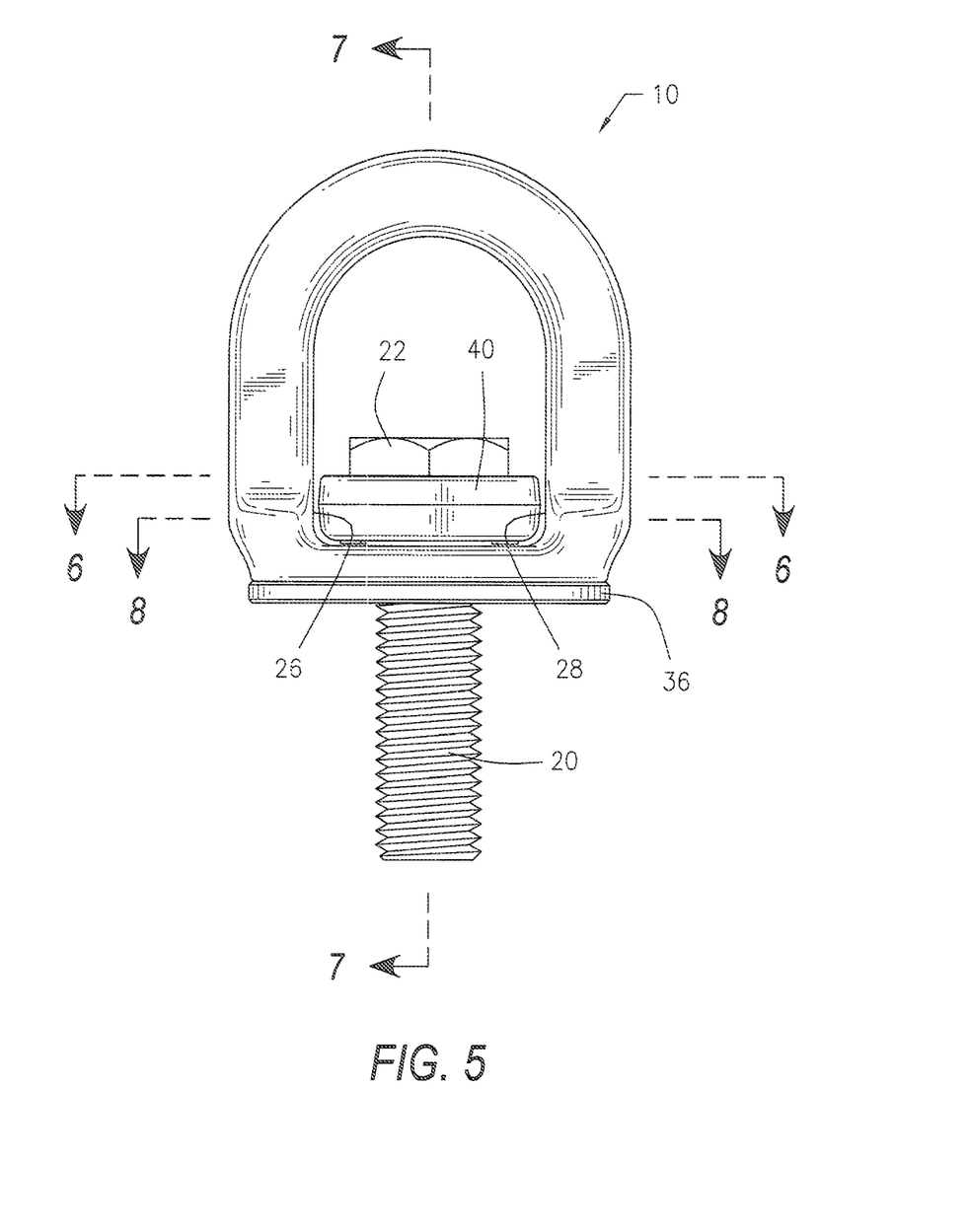
FIG. 5 illustrates a front view of the rotating eye bolt assembly shown in FIG. 3.

FIG. 5 is a front view of the eye bolt assembly 10 shown in FIG. 3. It can be seen that the opposed sides of the lock plate 40 are between the opposed walls 26 and 28 of the lifting bail 24.

Figure 6:
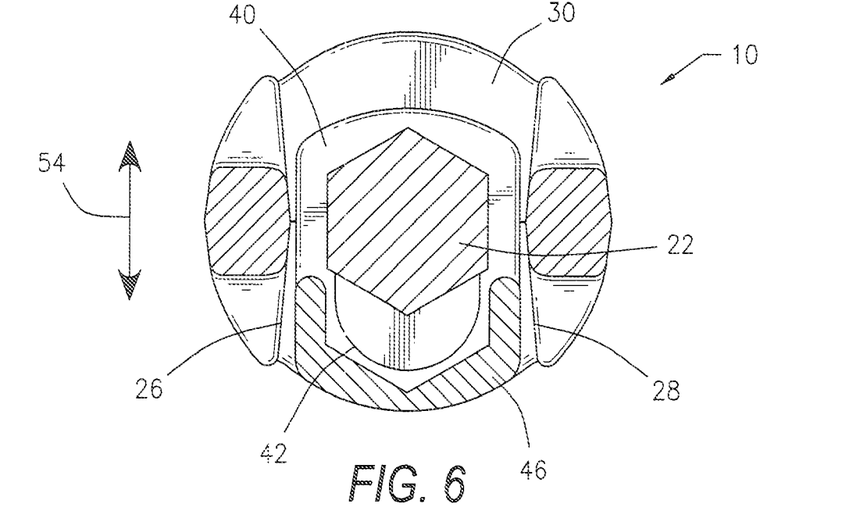
FIG. 6 illustrates a sectional view of the rotating eye bolt assembly shown in FIG. 5 taken along section line 6-6.

FIG. 6 illustrates a sectional view taken along section line 6-6 of FIG. 5. The eye bolt assembly 10 is shown in the unlocked position so that the head 22 of bolt 20 is disengaged from the upstanding shoulder 46 of the lock plate 40 to permit rotation of the lifting bail 24 with respect to the bolt 20. Arrow 54 illustrates movement of the lock plate 40 between the unlocked and locked position.

Figure 7:
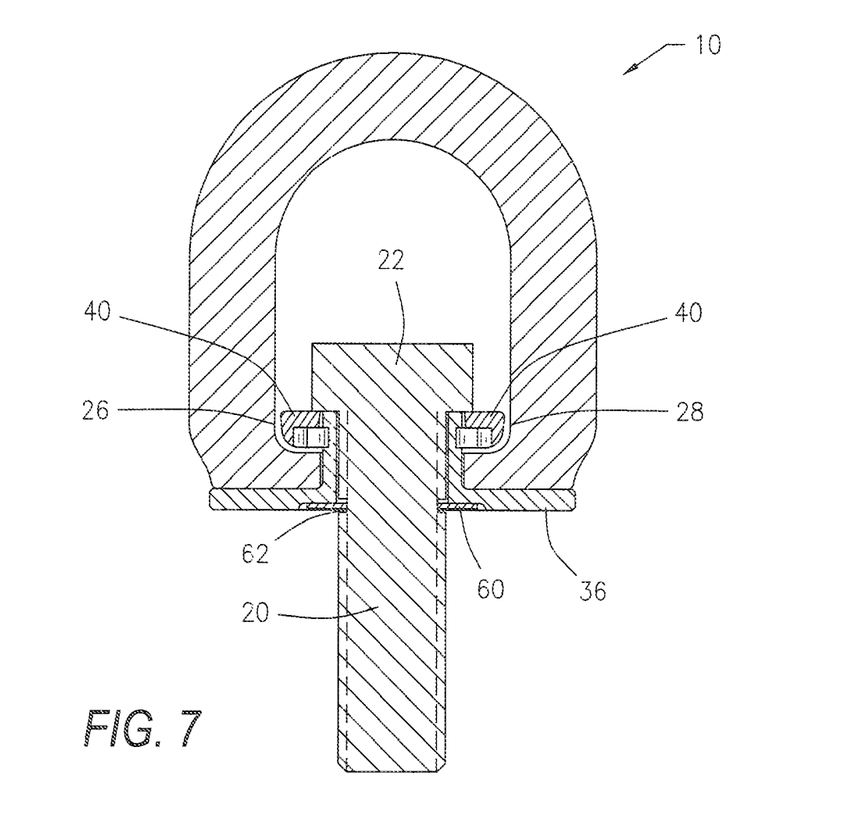
FIG. 7 illustrates a sectional view of the rotating eye bolt assembly shown in FIG. 5 taken along section line 7-7.

FIG. 7 is a sectional view taken along section line 7-7 of FIG. 5. The removable clip 60 around the shaft of the bolt 20 may be retained in a recess in the underside of the bushing 36 so that the bushing 36 will be flush against the load (not shown).

Figure 8A:
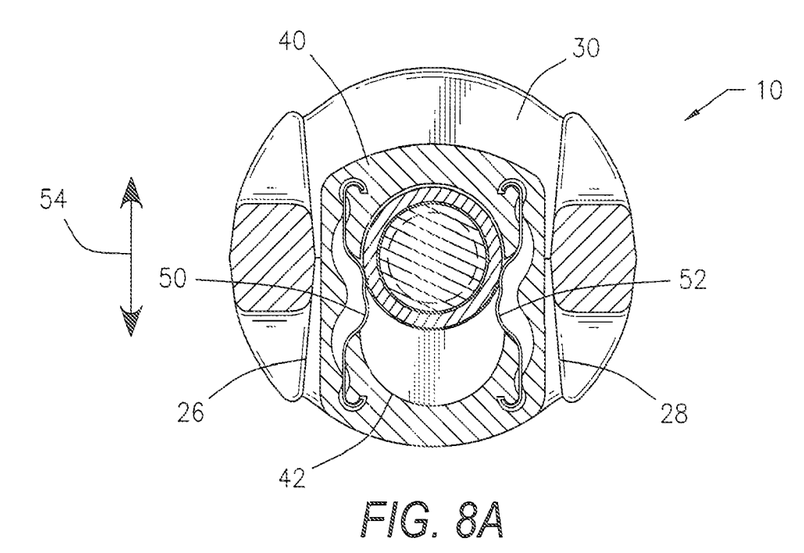
FIG. 8*a* illustrates a sectional view of the rotating eye bolt assembly shown in FIG. 5 taken along section line 8-8 of FIG. 5.
Figure 8B:
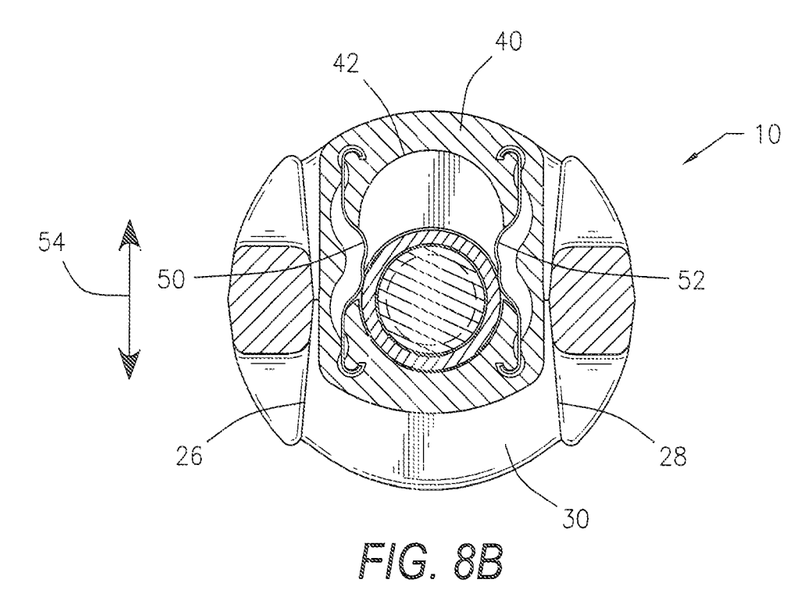
FIG. 8*b* illustrates the rotating eye bolt assembly shown in FIG. 8*a* moved to a locked position.

FIG. 8a illustrates a sectional view taken along section line 8-8 of FIG. 5. The pair of retaining springs 50 and 52 is visible. The ends of each of the retaining springs are retained in the lock plate 40. A portion of each of the retaining springs projects into the slot or opening 42 in the lock plate 40. The lock plate may be manually moved on the track 30 as shown by arrow 54. The springs serve to retain the lock plate 40 with respect to the shaft of the bolt 20 in the unlocked position as seen in FIG. 8A. It is possible to overcome the spring force and slide the lock plate 40 into a locked position, which is seen in FIG. 8B. The retaining springs tend to retain the lock plate 40 in the locked position.

Figure 8C:
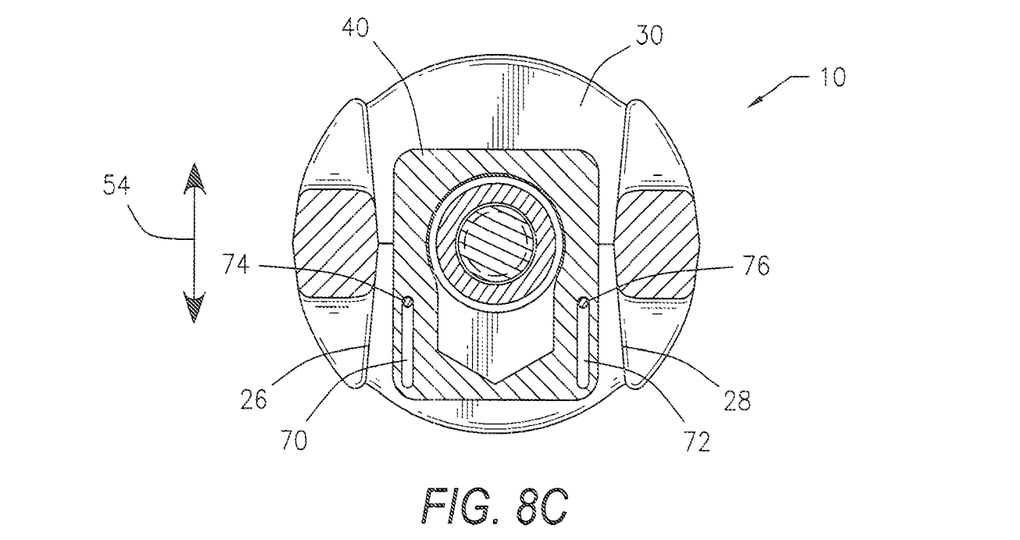
FIG. 8*c* illustrates an alternate embodiment of the rotating eye bolt assembly.

FIG. 8C shows an alternate embodiment of the present invention. Instead of use of the pair of retaining springs, a pair of slots 70 and 72 are provided through the lock plate 40. Once the lock plate is either in the open or in the locked position, a pair of threaded fasteners 74 and 76 will be tightened to secure the lock plate 40 to the track 30 of the bail 24. Unthreading of the fasteners 74 and 76 will permit movement of the lock plate 40.

Figure 8D:
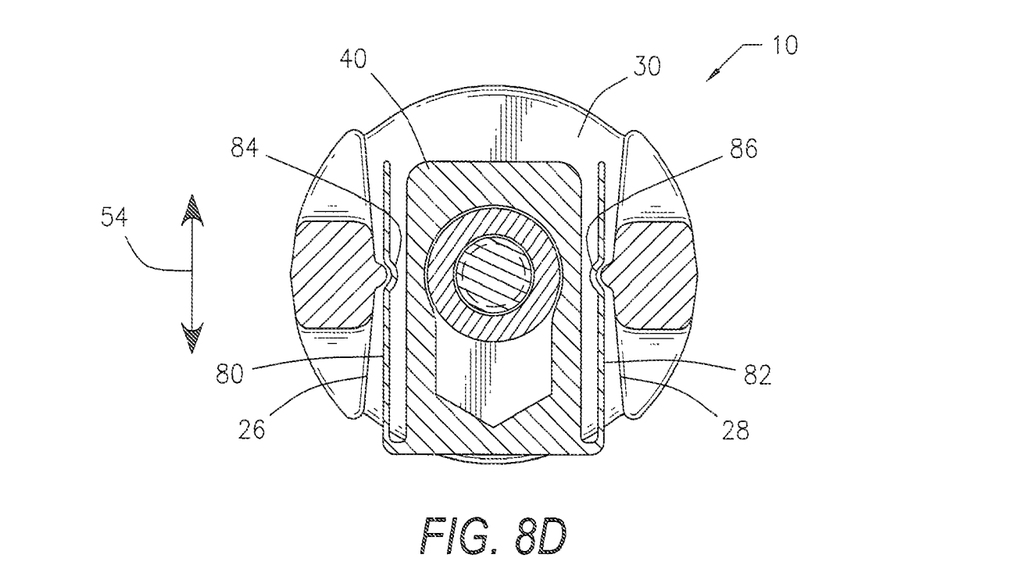
FIG. 8*d* illustrates a further alternate embodiment of the rotating eye bolt assembly.

FIG. 8D illustrates yet a further alternate embodiment of the present invention. In lieu of the retaining springs illustrated in the initial embodiment, the lock plate 40 has a pair of spring projections 80 and 82, which extend from the opposed sides of the lock plate 40. Each of the projections 80 and 82 includes a notch 84 and 86 which will mate with a corresponding projection from the opposed walls 26 and 28 in order to retain the lock plate 40 in the open, use position.

The present invention provides a rotating eye bolt assembly having a locked position for installation and removal and an unlocked position for use.

Whereas, the present invention has been described in relation to the drawings attached hereto, it should be understood that other and further modifications, apart from those shown or suggested herein, may be made within the spirit and scope of this invention.

What is claimed is:

1. A rotating eye bolt assembly with lock mechanism, which assembly comprises:
    a bolt having a multi-sided head;
    a lifting bail with a flat track and a central opening through said flat track configured to receive said bolt;
    a bushing having an upstanding cylindrical lip, said bushing receivable in and through said lifting bail central opening; and
    a lock plate having a top surface and an opposed substantially flat bottom surface, said bottom surface slidable on said track, said lock plate having a pair of opposed ends with an upstanding shoulder at one of said ends engageable with said bolt head, having an elongated slot through said lock plate and having at least one retaining spring, wherein said lock plate and said track are configured so that said head of said bolt rests on said top surface of said lock plate;
    wherein said lock plate is slidable on said track between a locked position and an unlocked position such that:
        in the locked position, said upstanding shoulder is engaged with said bolt head to prevent rotation of said lifting bail with respect to said bushing; and
        in the unlocked position, said upstanding shoulder is disengaged from said bolt head such that said lifting bail is rotatable with respect to said bushing.

2. A rotating eye bolt assembly with lock mechanism as set forth in claim 1 wherein said lifting bail has a pair of opposed walls which constrain movement of said lock plate on said track.

3. A rotating eye bolt assembly with lock mechanism as set forth in claim 1 wherein said bolt has a circumferential groove and wherein a removable clip is receivable in said groove.

4. A rotating eye bolt assembly with lock mechanism as set forth in claim 1 wherein said at least one retaining spring comprises a pair of retaining springs.

5. A rotating eye bolt assembly with lock mechanism as set forth in claim 4 wherein each of said pair of retaining springs extends from said lock plate into an opening in said upstanding cylindrical lip of said bushing.

6. A rotating eye bolt assembly with lock mechanism as set forth in claim 1 wherein said bolt has a shaft having an axis and wherein said track is perpendicular to said bolt axis.

7. A rotating eye bolt assembly with lock mechanism as set forth in claim 1 wherein said bolt has a hexagon head.

* * * * *